(12) United States Patent
Won et al.

(10) Patent No.: US 9,475,402 B2
(45) Date of Patent: Oct. 25, 2016

(54) SYSTEM AND METHOD FOR MANAGING ELECTRIC VEHICLE

(71) Applicant: SK TELECOM CO., LTD., Seoul (KR)

(72) Inventors: Eun Kyoung Won, Seoul (KR); Dae Lim Son, Seoul (KR)

(73) Assignee: SK TELECOM CO., LTD., Seoul (KR)

( * ) Notice: Subject to any disclaimer, the term of this patent is extended or adjusted under 35 U.S.C. 154(b) by 0 days.

(21) Appl. No.: 14/405,312

(22) PCT Filed: Jul. 31, 2013

(86) PCT No.: PCT/KR2013/006912
§ 371 (c)(1),
(2) Date: Dec. 3, 2014

(87) PCT Pub. No.: WO2014/061904
PCT Pub. Date: Apr. 24, 2014

(65) Prior Publication Data
US 2015/0134167 A1    May 14, 2015

(30) Foreign Application Priority Data

Oct. 15, 2012  (KR) .................. 10-2012-0113978
Oct. 16, 2012  (KR) .................. 10-2012-0114846

(51) Int. Cl.
*B60L 11/18*    (2006.01)
*G01C 21/34*    (2006.01)
(Continued)

(52) U.S. Cl.
CPC ........ *B60L 11/1862* (2013.01); *B60L 11/1846* (2013.01); *G01C 21/3469* (2013.01);
(Continued)

(58) Field of Classification Search
CPC .................. B60L 11/1842; B60L 11/1848
See application file for complete search history.

(56) References Cited

U.S. PATENT DOCUMENTS 8,232,763 B1    7/2012  Boot
2008/0221746 A1*  9/2008  Plishner .................. B60L 8/003
                                              701/22

(Continued)

FOREIGN PATENT DOCUMENTS

CN    201583995 U    9/2010
CN    102442218 A    5/2012
(Continued)

OTHER PUBLICATIONS

International Search Report for PCT/KR2013/006912 dated Nov. 21, 2013.

*Primary Examiner* — Todd Melton
(74) *Attorney, Agent, or Firm* — Hauptman Ham, LLP

(57) ABSTRACT

Disclosed are a system and method for managing an electric vehicle. The system includes: a vehicle state information collecting device collecting vehicle state information from one or more sensors; a terminal device receiving the vehicle state information from the vehicle state information collecting device and transmits the received information together with current position information and a vehicle ID for identifying the electric vehicle; and an electric vehicle managing device receiving and storing the vehicle state information for the vehicle ID, comparing the vehicle state information with a preset reference value of the information to determine whether to create a vehicle management message, and creating the vehicle management message that includes the place related to the vehicle state information or the position information of another electric vehicle on the basis of the current position information for the electric vehicle so as to transmit the message to the terminal device.

9 Claims, 5 Drawing Sheets

(51) Int. Cl.
*G07C 5/00* (2006.01)
*G07C 5/06* (2006.01)
*G07C 5/08* (2006.01)
*G01C 21/36* (2006.01)

(52) U.S. Cl.
CPC .............. *G01C21/362* (2013.01); *G07C 5/006* (2013.01); *G07C 5/0816* (2013.01); *B60L 11/1842* (2013.01); *B60L 11/1848* (2013.01); *B60L 2230/40* (2013.01); *B60L 2240/62* (2013.01); *B60L 2240/622* (2013.01); *B60L 2240/72* (2013.01); *B60L 2250/16* (2013.01); *G07C 5/008* (2013.01); *G07C 5/0841* (2013.01); *Y02T 10/705* (2013.01); *Y02T 10/7005* (2013.01); *Y02T 10/7044* (2013.01); *Y02T 10/7088* (2013.01); *Y02T 10/7291* (2013.01); *Y02T 90/121* (2013.01); *Y02T 90/128* (2013.01); *Y02T 90/14* (2013.01); *Y02T 90/16* (2013.01); *Y02T 90/161* (2013.01); *Y02T 90/162* (2013.01); *Y02T 90/163* (2013.01); *Y02T 90/168* (2013.01); *Y02T 90/169* (2013.01); *Y04S 30/12* (2013.01); *Y04S 30/14* (2013.01)

(56) References Cited

U.S. PATENT DOCUMENTS

| | | | |
|---|---|---|---|
| 2011/0025267 A1* | 2/2011 | Kamen | B60L 8/003 320/109 |
| 2012/0109409 A1* | 5/2012 | Hara | B60L 11/1818 701/1 |
| 2012/0200258 A1 | 8/2012 | Lee | |
| 2013/0173331 A1* | 7/2013 | Mohagheghi | B60L 11/1838 705/7.25 |
| 2013/0204471 A1* | 8/2013 | O'Connell | H02J 3/008 701/22 |

FOREIGN PATENT DOCUMENTS

| | | |
|---|---|---|
| CN | 102725173 A | 10/2012 |
| JP | 2008249503 A | 10/2008 |
| JP | 2012147580 A | 8/2012 |
| KR | 1020110002905 A | 1/2011 |
| KR | 1020110124187 A | 11/2011 |
| KR | 1020120049947 A | 5/2012 |
| KR | 1020120090677 A | 8/2012 |

\* cited by examiner

SYSTEM AND METHOD FOR MANAGING ELECTRIC VEHICLE

TECHNICAL FIELD

The present invention relates to an electric vehicle management system and a method thereof, and more specifically, to an electric vehicle management system and a method thereof, which can guarantee smooth driving of an electric vehicle by transmitting a vehicle management message for guiding recharge of a battery, inspection and repair of the vehicle and the like according to a state of the electric vehicle.

BACKGROUND ART

Recently, interest in electric vehicles as an eco-friendly transportation means explosively increases. Since such an electric vehicle uses electricity as a power source, the vehicle operates after a battery is recharged at a charging station for charging electricity.

In order to charge the electric vehicle, a charging station which supplies power to the electric vehicle is used, or the battery can be recharged while the electric vehicle drives on a power supplied road, or power can be supplied from other electric vehicles.

In the case of an electric vehicle, recharge of a battery is the most importing thing in driving, and thus continuous monitoring of a state of the battery and an appropriate measure based on the state are important. However, it is not easy for a driver to continuously monitor states of the electric vehicle such as a battery state, a vehicle information state and the like while driving, and it is difficult for the driver of the electric vehicle to find out a location of a charging station or a service center, and thus when a problem occurs in the vehicle, it is difficult to take a proper action.

DISCLOSURE OF INVENTION

Technical Problem

Therefore, the present invention has been made in view of the above problems, and it is an object of the present invention to provide an electric vehicle management system and a method thereof, which can guarantee smooth driving of an electric vehicle by receiving state information of the vehicle from the driving electric vehicle and transmitting a vehicle management message for guiding recharge of a battery, inspection and repair of the vehicle and the like according to a state of the electric vehicle.

Technical Solution

To accomplish the above object, according to one aspect of the present invention, there is provided an electric vehicle management device including: a communication unit for receiving vehicle state information related to operation of an electric vehicle, a vehicle ID, current position information and destination information from a terminal device and transmitting a vehicle management message to the terminal device; a vehicle state information database for storing a reference value for determining whether or not to create the vehicle management message according to the vehicle state information; an electric vehicle information database for storing the ID, the vehicle state information, the destination information and the current position information of the electric vehicle; a vehicle state determination unit for determining whether or not to create the vehicle management message by comparing the vehicle state information received through the communication unit with the reference value of the vehicle state information stored in the vehicle state information database; an electric vehicle matching unit for matching an electric vehicle which will supply power and an electric vehicle which will be supplied with the power according to power information, a current position and a destination of each electric vehicle; and a vehicle management message creation unit for creating the vehicle management message including a place related to the vehicle state information, position information of other electric vehicles related to the vehicle state information, or a position of an electric vehicle which will supply power and route information for moving to the corresponding electric vehicle, based on the current position information of the electric vehicle according to a result of the determination of the vehicle state determination unit, and transmitting the vehicle management message to the terminal device.

In addition, if a battery remaining capacity included in the vehicle state information is lower than a battery remaining capacity set in the vehicle state information reference value, the vehicle state determination unit may determine creation of the vehicle management message, and the electric vehicle matching unit may search for position information of other electric vehicles that can supply power within a reference distance based on the current position information of the electric vehicle and match an electric vehicle which will supply power and an electric vehicle which will be supplied with the power, and the vehicle management message creation unit may create a vehicle management message including position information of an electric vehicle that can supply power and transmit the vehicle management message to the terminal device.

In addition, the vehicle management message may further include an amount of power to be provided when the power is charged and information on a charging station where power will be charged after supplying the power.

According to still another aspect of the present invention, there is provided an electric vehicle management system including: a vehicle state information collecting device for collecting vehicle state information from one or more sensors sensing the vehicle state information including battery power information related to operation of an electric vehicle; a terminal device for receiving the vehicle state information from the vehicle state information collecting device and transmitting the vehicle state information together with current position information, destination information and a vehicle ID for identifying the electric vehicle; and an electric vehicle management device for receiving the vehicle state information and storing the vehicle state information by the vehicle ID, determining whether or not to create a vehicle management message by comparing the vehicle state information with a previously set vehicle state information reference value, creating the vehicle management message including a place related to the vehicle state information or position information of other electric vehicles related to the vehicle state information based on the current position information of the electric vehicle, and transmitting the vehicle management message to the terminal device.

In addition, if a battery remaining capacity included in the vehicle state information is lower than a battery remaining capacity set in the vehicle state information reference value, the electric vehicle management device may search for position information of other electric vehicles that can supply power within a reference distance based on the current position information of the electric vehicle, match an electric vehicle which will supply power and an electric vehicle which will be supplied with the power, create a vehicle management message including position information of an electric vehicle that can supply power according to a matching result, and transmit the vehicle management message to the terminal device.

In addition, the vehicle management message may further include an amount of power to be provided when the power is charged and information on a charging station where power will be charged after supplying the power.

According to still another aspect of the present invention, there is provided a control method of an electric vehicle management device, the method including the steps of: (a) receiving vehicle state information including battery power information related to operation of an electric vehicle, a vehicle ID, current position information and destination information from a terminal device; (b) storing the vehicle state information by the vehicle ID and determining whether or not to create a vehicle management message by comparing the vehicle state information with a previously set vehicle state information reference value; and (c) creating the vehicle management message including a place related to the vehicle state information or position information of other electric vehicles related to the vehicle state information based on the current position information of the electric vehicle according to a result of the determination of a vehicle state determination unit, and transmitting the vehicle management message to the terminal device.

In addition, the vehicle management message may further include an amount of power to be provided when the power is charged and information on a charging station where power will be charged after supplying the power.

In addition, the control method may further include, after step (c), the steps of: collecting charging history of the electric vehicle which has supplied the power based on the vehicle management message; and giving a reward according to the charging history.

In addition, step (b) may include the steps of: determining, when power of a battery is lower than a battery remaining capacity set in the reference value, the corresponding electric vehicle as an electric vehicle which will be supplied with power; and confirming information on power of electric vehicles operating within a reference distance based on the current position information of the electric vehicle which will be supplied with power, and matching an electric vehicle which will supply power and the electric vehicle which will be supplied with power.

Advantageous Effects

As described above, an electric vehicle management system and a method thereof of the present invention may guarantee smooth driving of an electric vehicle by receiving state information of the vehicle from the driving electric vehicle and transmitting a vehicle management message for guiding recharge of a battery, inspection and repair of the vehicle and the like.

In addition, an electric vehicle management system and a method thereof of the present invention may provide convenience of vehicle management by receiving state information of the vehicle from the driving electric vehicle and guiding a charging station, a service center or the like which can be visited from the current position of the electric vehicle.

DESCRIPTION OF SYMBOLS

Figure 1:
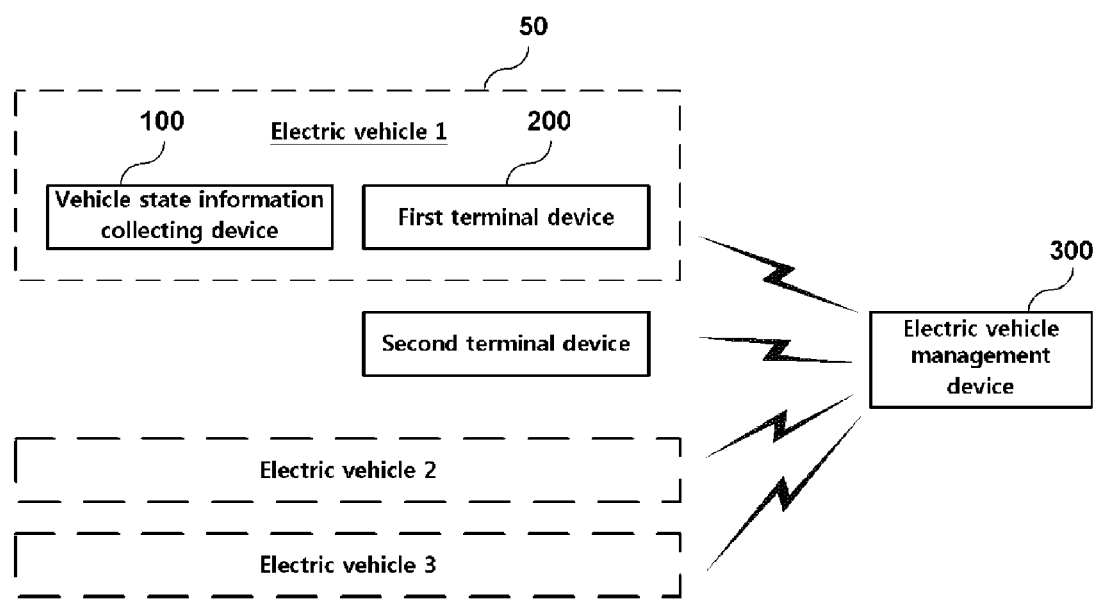
FIG. 1 is a view showing the configuration of an electric vehicle management system according to an embodiment of the present invention.

50: Electric vehicle 100: Vehicle state information collection device
200: Terminal device 210: Vehicle state information receiving unit
220: Input unit 230: Vehicle management message processing unit
240: Communication unit 250: Control unit
260: Memory 270: Position information collection unit
300: Electric vehicle management device 310: Communication unit
320: Vehicle state determination unit 330: Vehicle management message creation unit
340: Vehicle state information DB 350: Electric vehicle information DB
360: Charging station information DB 370: Electric vehicle matching unit

MODE FOR INVENTION

The preferred embodiments of the present invention will be hereafter described in detail, with reference to the accompanying drawings. Furthermore, in the drawings illustrating the embodiments of the present invention, elements having like functions will be denoted by like reference numerals and details thereon will not be repeated.

FIG. 1 is a view showing the configuration of an electric vehicle management system according to an embodiment of the present invention.

As shown in FIG. 1, an electric vehicle management system includes a vehicle state information collecting device 100, terminal devices 20 and 200 and an electric vehicle management device 300.

An electric vehicle 50 is a vehicle running by driving an electric motor using power of a charged battery. For example, the electric vehicle 50 may include various types of vehicles which use battery power as a driving power, such as a neighborhood electric vehicle (NEV), an electric vehicle (EV), an online electric vehicle (OLEV), a plug-in hybrid electric vehicle (PHEV) and the like.

The vehicle state information collecting device 100 collects sensed values from one or more sensors sensing vehicle state information including information on battery power and transfers the collected values to the terminal device 20. The sensors sensing the vehicle state information may be mounted on the electric vehicle 50 and sense information, such as a battery remaining capacity, a vehicle speed, a tire state and the like, related to operation of the electric vehicle 50.

The terminal device 200 transmits the vehicle state information received from the vehicle state information collecting device 100 to the electric vehicle management device 300. The terminal device 200 may transmit a vehicle ID assigned for identification of an electric vehicle, information on the current position and destination of the electric vehicle 50 together when the vehicle state information is transmitted.

Then, the terminal device 200 may output a vehicle management message received from the electric vehicle management device 300. The vehicle management message may include actions to be taken, a place to visit and the like for normal operation of the electric vehicle 50. For example, the terminal device 200 may provide battery recharge guidance and a route to a charging station or provide tire inspection guidance and a route to a service center. Such a vehicle management message may be provided in a variety of forms such as text, image, voice, video and the like.

Here, the terminal device 200 may be fixedly mounted on the electric vehicle 50 or may be provided in the form of a terminal detachable as needed. In addition, when the terminal device 200 is fixedly mounted on the electric vehicle 50, it may be configured to confirm the vehicle management message displayed on a fixed first terminal device 200 also through a second terminal device possessed by a user.

The electric vehicle management device 300 receives the vehicle state information from the terminal device 200, analyzes the vehicle state information, and transmits a vehicle management message for guiding recharge of a battery, inspection and repair of the vehicle and the like to the terminal device 200 based on the analyzed state of the electric vehicle 50. For example, when the electric vehicle 50 is in a state of insufficient battery, a charging station for charging power is guided or a position of another electric vehicle 50 which can supply power to the electric vehicle 50 can be guided based on the current position of the electric vehicle 50.

Figure 2:
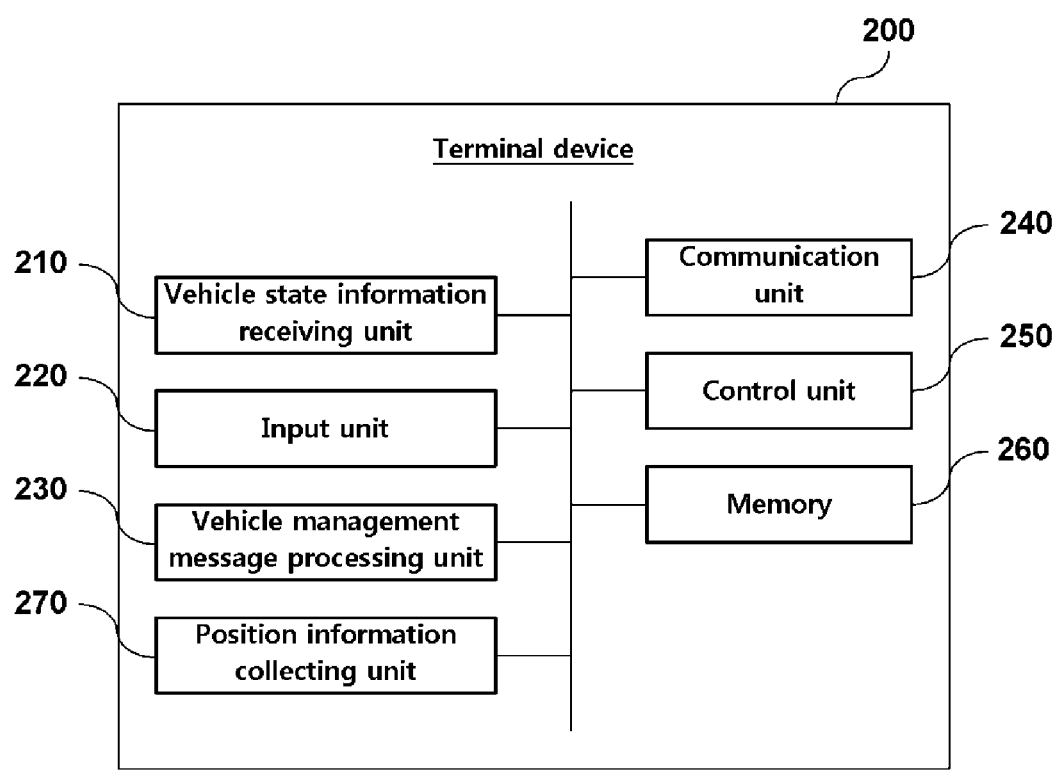
FIG. 2 shows a control block diagram of a terminal device according to an embodiment of the present invention.

FIG. 2 shows a control block diagram of a terminal device 200 according to an embodiment of the present invention.

As shown in FIG. 2, the terminal device 200 includes a vehicle state information receiving unit 210, an input unit 220, a vehicle management message processing unit 230, a communication unit 240, a control unit 250, a memory 260 and a position information collecting unit 270.

The vehicle state information receiving unit 210 receives vehicle state information from the vehicle state information collecting device 100. The vehicle state information may include information related to operation of the electric vehicle 50, such as battery remaining capacity information of the vehicle state information collecting device 100, vehicle speed information, tire state information and the like.

The communication unit 240 transmits the vehicle state information received from the vehicle state information receiving unit 210 to the electric vehicle management device 300 under the control of the control unit 250. Then, the communication unit 240 receives a vehicle management message from the electric vehicle management device 300 and transfers the vehicle management message to the vehicle management message processing unit 230.

An application for connecting and communicating with the electric vehicle management device 300 is stored in the memory 260.

The vehicle management processing unit 230 processes the vehicle management message received through the communication unit 240 and outputs the vehicle management message in the form of text, image, voice, video or the like. Here, the vehicle management message may include actions to be taken, a place to visit and the like for normal operation of the electric vehicle 50. For example, it may provide battery recharge guidance and a route to a charging station or provide tire inspection guidance and a route to a service center.

The control unit 250 may attempt connection to the electric vehicle management device 300 by executing an application stored in the memory 260 according to selection of a user through the input unit 220 and may select a menu item to control the terminal device 200. Here, the input unit 220 may receive destination information according to handling of the user.

The control unit 250 transmits the vehicle state information received by the vehicle state information receiving unit 210 to the electric vehicle management device 300 through the communication unit 240 and processes and outputs the vehicle management message received by the communication unit 240 through the vehicle management processing unit 230.

The position information collecting unit 270 may collect current position information of the electric vehicle.

Figure 3:
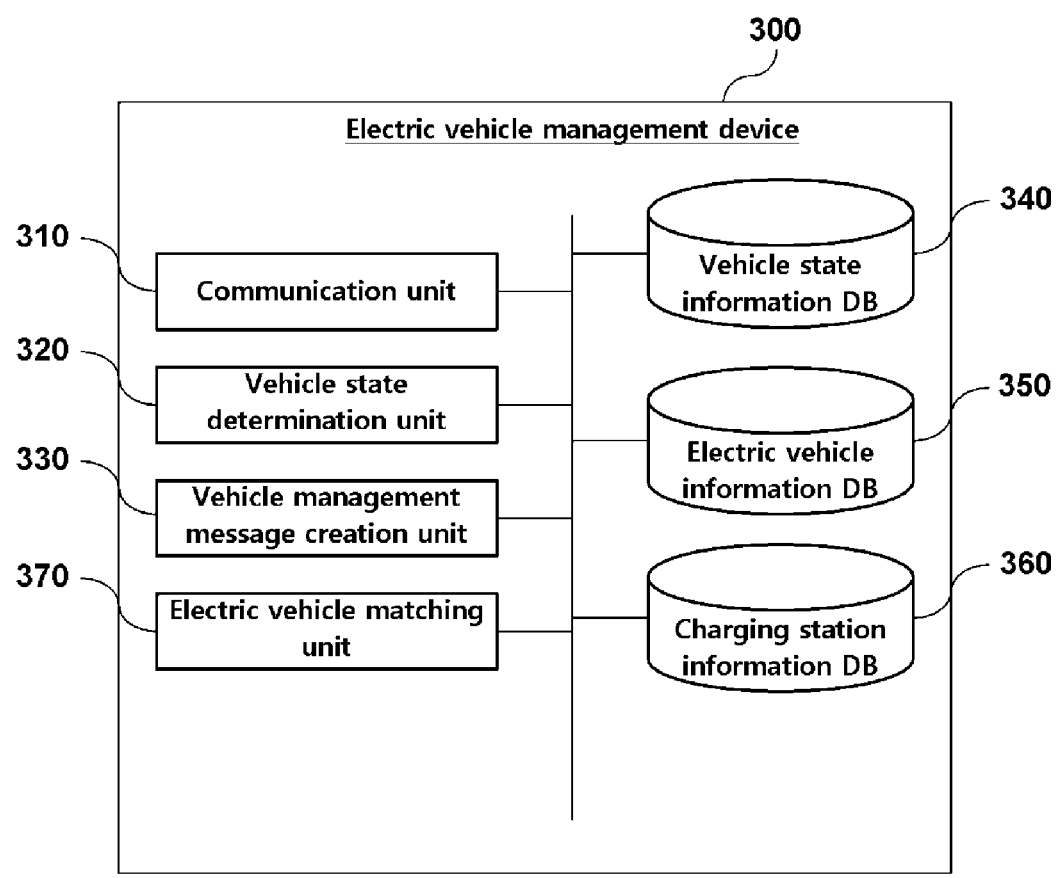
FIG. 3 shows a control block diagram of an electric vehicle management device according to an embodiment of the present invention.

FIG. 3 shows a control block diagram of an electric vehicle management device according to an embodiment of the present invention.

As shown in FIG. 3, the electric vehicle management device 300 includes a communication unit 310, a vehicle state determination unit 320, a vehicle management message creation unit 330, a vehicle state information DB 340, an electric vehicle information DB 350, a charging station information DB 360 and an electric vehicle matching unit 370.

The vehicle state information DB 340 stores a reference value of vehicle state information for determining whether or not to create a vehicle management message according to the vehicle state information. The reference value of the vehicle state information includes a reference value of a battery remaining capacity for informing recharge of a battery, a reference value of tire pressure for informing repair of a tire, and the like.

The electric vehicle information DB 350 stores an ID of a vehicle, vehicle state information of the corresponding electric vehicle 50, current position information and destination information of the corresponding electric vehicle 50 received through the communication unit 310.

The charging station information DB 360 stores location information of a charging station where power can be charged in the electric vehicle 50.

The communication unit 310 receives the vehicle state information, the vehicle ID, the current position information and the destination information and transfers the information to the vehicle state determination unit 320.

The vehicle state determination unit 320 determines whether or not to create a vehicle management message by comparing the vehicle state information received through the communication unit 310 with a reference value of the vehicle state information stored in the vehicle state information DB 340. When the compared reference value matches a vehicle management message creation condition, the vehicle state determination unit 320 transfers a result of the determination to the vehicle management message creation unit 330.

The electric vehicle matching unit 370 may match an electric vehicle which will supply power and the electric vehicle which will be supplied with power based on the current position and the destination. That is, the electric vehicle matching unit 370 searches for position information of other electric vehicles that can supply power within a reference distance based on the current position information of an electric vehicle and matches the electric vehicles.

The vehicle management message creation unit 330 creates a vehicle management message matching to the vehicle state based on the result of determination of the vehicle state determination unit 320.

For example, when the electric vehicle 50 is in a state of insufficient battery, the vehicle management message creation unit 330 selects a charging station where the battery can be recharged from the charging station information DB 360 based on the current position of the electric vehicle 50. The vehicle management message creation unit 330 creates a vehicle management message including route information for moving to the selected charging station and transmits the vehicle management message to the terminal device 200. Here, if a charging station reachable from the current position of the electric vehicle 50 does not exist, the vehicle management message creation unit 330 searches for another electric vehicle 50 which can supply charging power from the electric vehicle information DB. For another example, the vehicle management message creation unit 330 may receive a result of matching from the electric vehicle matching unit 370, create a vehicle management message including a position of an electric vehicle which will supply power and route information for moving to the corresponding electric vehicle, and then transmit the vehicle management message to the terminal device 200.

The vehicle management message creation unit 330 creates a vehicle management message including a position of the selected electric vehicle 50 and route information for moving to the corresponding electric vehicle 50 and transmits the vehicle management message to the terminal device 200. In addition, the vehicle management message creation unit 330 requests the user terminal device of the electric vehicle 50 which will supply power to supply of power, creates a vehicle management message for guiding an amount of power to provide when the power is charged and a charging station for charging power after supplying the power, and provide the vehicle management message to the user terminal device of the electric vehicle 50 which will supply power.

In addition, when it needs to check tire pressure of the electric vehicle 50 or a part to be repaired is found, the vehicle management message creation unit 330 may search for a service center reachable from the current position of the electric vehicle 50 and provide a vehicle management message for guiding a route for moving to a corresponding service center.

According to such a configuration, the electric vehicle management device 300 receiving the vehicle state information analyzes the received vehicle state information, and if the analyzed result matches a previously set vehicle management message creation condition, it may create a corresponding vehicle management message and transmit the vehicle management message to the terminal device 200.

Figure 4:
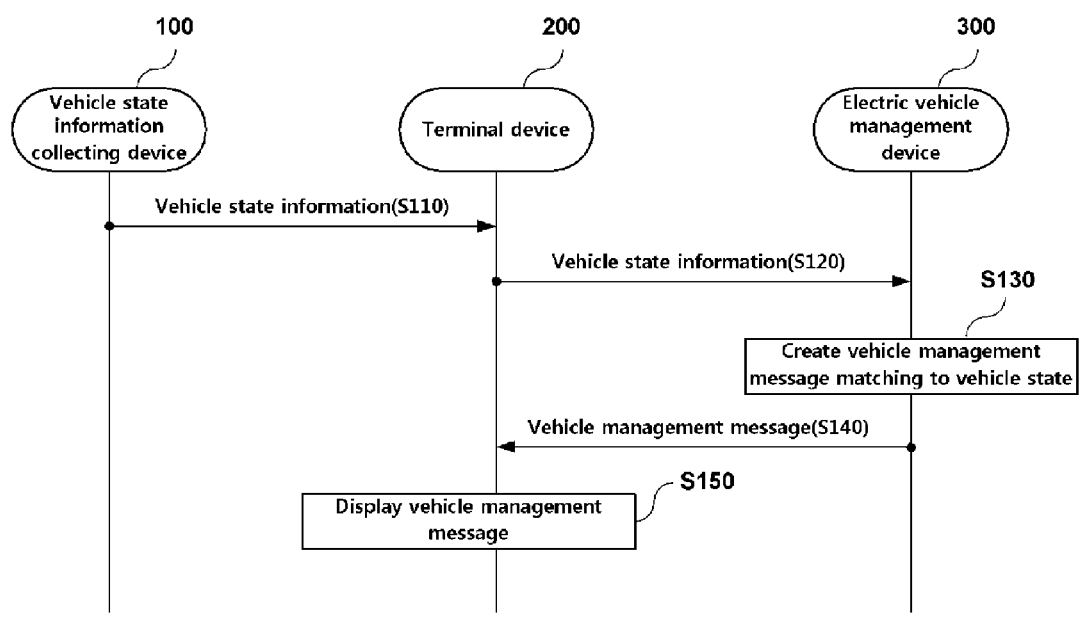
FIG. 4 is a flowchart illustrating control flow of an electric vehicle management system according to an embodiment of the present invention.

FIG. 4 is a flowchart illustrating control flow of an electric vehicle management system according to an embodiment of the present invention.

If the electric vehicle 50 starts to operate, the vehicle state information collecting device 100 collects sensed values from one or more sensors sensing vehicle state information including information on battery power and transfers the collected values to the terminal device 20 (S110). The sensor sensing the vehicle state information may be mounted on the electric vehicle 50 and sense information, such as a battery remaining capacity, a vehicle speed, a tire state and the like, related to operation of the electric vehicle 50.

The terminal device 200 transmits the vehicle state information received from the vehicle state information collecting device 100 to the electric vehicle management device 300 (S120). The terminal device 200 may transmit a vehicle ID assigned for identification of an electric vehicle, information on the current position and destination of the electric vehicle 50 together when the vehicle state information is transmitted.

The electric vehicle management device 300 receives the vehicle state information including battery power information, a vehicle ID, position information and destination information from the terminal device 200 and stores the received information (S120), confirms whether or not the received vehicle state information matches a previously set vehicle management message creation condition, and creates a vehicle management message (S130). For example, when the electric vehicle 50 is in a state of insufficient battery, the electric vehicle management device 300 may search for a charging station where the battery can be recharged and create a vehicle management message including route information for moving to the corresponding charging station, and if there is no reachable charging station, the electric vehicle management device 300 may search for another electric vehicle 50 which can supply charging power and create a vehicle management message including a position of a corresponding electric vehicle 50 and route information for moving to the corresponding electric vehicle 50.

The electric vehicle management device 300 transmits the created vehicle management message to the terminal device 200 (S140).

The terminal device 200 receives the vehicle management message from the electric vehicle management device 300 and outputs the electric vehicle management device 300 to the user (S150). The terminal device 200 may output the vehicle management message in the form of text, image, voice, video or the like according to a data format included in the vehicle management message.

Figure 5:
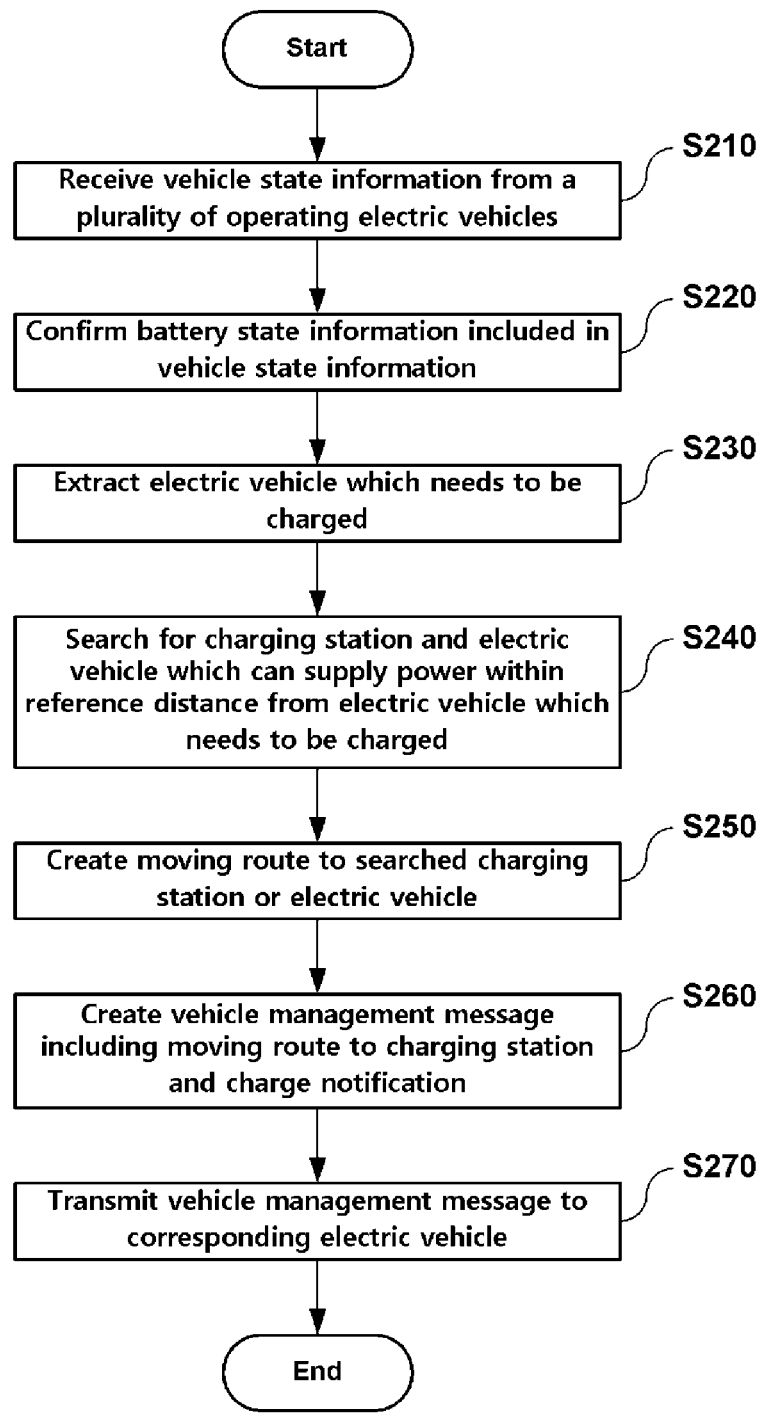
FIG. 5 is a flowchart illustrating an electric vehicle management method according to an embodiment of the present invention.

FIG. 5 is a flowchart illustrating an electric vehicle management method according to an embodiment of the present invention, showing an example of control flow of the electric vehicle management device 300 in the case of managing battery remaining capacity information among the vehicle state information.

The electric vehicle management device 300 receives vehicle state information from a plurality of operating electric vehicles 50 (S210). Here, the vehicle state information may be received together with a vehicle ID of a corresponding electric vehicle 50 and position information and destination information of the vehicle.

The vehicle state determination unit 320 confirms battery state information included in the vehicle state information (S220).

The vehicle state determination unit 320 extracts an electric vehicle 50 which needs to be charged based on a reference value of the vehicle state information stored in the vehicle state information DB 340.

Next, the vehicle management message creation unit 330 searches for a charging station and an electric vehicle 50 which can supply power within a reference distance from the electric vehicle which needs to be charged (S240).

The vehicle management message creation unit 330 creates a moving route to a searched charging station or electric vehicle 50 (S250) and creates a vehicle management message including the moving route and a charge notification (S260).

The electric vehicle management device 300 transmits the created vehicle management message to a corresponding electric vehicle 50 (S270). In addition, the vehicle management message creation unit 330 may collect charging history of the electric vehicle which has supplied the power based on the vehicle management message and give a reward according to the charging history. For example, the electric vehicle which has supplied power may have a benefit of a discounted price when it charges power at a charging station, or points may be granted to the electric vehicle. In addition, the charging history can be collected by transmitting a charge confirmation message by a user who has been supplied with power using a terminal device or transmitting a charge confirmation message by a user who has supplied power using a terminal device of his or her own.

In addition, when power of the battery is lower than the battery remaining capacity set in a reference value, the electric vehicle management device 300 may determine the corresponding electric vehicle as an electric vehicle which will be supplied with power, confirm information on the power of electric vehicles operating within a reference distance based on the current position information of the electric vehicle which will be supplied with power, and match an electric vehicle which will supply power and the electric vehicle which will be supplied with power.

Such a control method of the electric vehicle management device can be created as a program, and the codes and code segments configuring the program may be easily inferred by the programmers in the art. In addition, the program related to the control method of the electric vehicle management device may be stored in an information storage medium that can be read by an electronic device and read and executed by the electronic device.

While the present invention has been described with reference to the particular illustrative embodiments, it is not to be restricted by the embodiments but only by the appended claims. It is to be appreciated that those skilled in the art can change or modify the embodiments without departing from the scope and spirit of the present invention.

The invention claimed is:

1. An electric vehicle management device, comprising:
   a communication unit configured to
      receive vehicle state information comprising at least one information selected from the group consisting of operation information of an electric vehicle, a vehicle identification (ID), current position information and destination information, from a terminal device, and
      transmit a vehicle management message to the terminal device;
   a vehicle state information database configured to store a reference value for determining whether or not to create the vehicle management message according to the vehicle state information;
   an electric vehicle information database configured to store the ID, the vehicle state information, the destination information and the current position information of the electric vehicle;
   a vehicle state determination unit configured to determine whether or not to create the vehicle management message by comparing the vehicle state information received through the communication unit with the reference value of the vehicle state information stored in the vehicle state information database;
   an electric vehicle matching unit configured to match an electric vehicle configured to supply power and an electric vehicle configured to be supplied with the power according to power information, a current position and a destination of each electric vehicle; and
   a vehicle management message creation unit configured to
      create the vehicle management message including a place related to the vehicle state information, position information of other electric vehicles related to the vehicle state information, or a position of the electric vehicle configured to supply power and route information for moving to the corresponding electric vehicle, based on the current position information of the electric vehicle according to a result of the determination of the vehicle state determination unit, and
      transmit the vehicle management message to the terminal device,
   wherein the vehicle management message includes charging history of the electric vehicle which has supplied the power, and a reward for the electric vehicle according to the charging history, and
   wherein the reward is discounted price when a price is charged for power at a charging station.

2. The device according to claim 1,
   wherein the vehicle state information includes information on a battery remaining capacity, and
   wherein, when the battery remaining capacity is lower than a battery remaining capacity set in the vehicle state information reference value:
      the vehicle state determination unit is configured to determine a creation of the vehicle management message; and
      the electric vehicle matching unit is configured to
         search for position information of other electric vehicles are able to supply power within a reference distance based on the current position information of the electric vehicle, and
         match the electric vehicle configured to supply power and the electric vehicle configured to be supplied with the power; and
      the vehicle management message creation unit is configured to
         create the vehicle management message including position information of an electric vehicle which is able to supply power, and
         transmit the vehicle management message to the terminal device.

3. The device according to claim 1, wherein the vehicle management message further includes an amount of power to be provided when the power is charged and information on the charging station where power will be charged after supplying the power.

4. An electric vehicle management system, comprising:
   a vehicle state information collecting device configured to collect vehicle state information from one or more sensors configured to sense the vehicle state information including battery power information related to operation of an electric vehicle;
   a terminal device configured to
      receive the vehicle state information from the vehicle state information collecting device, and
      transmit the vehicle state information with current position information, destination information and a vehicle (ID) for identifying the electric vehicle; and
   an electric vehicle management device configured to
      receive the vehicle state information,
      store the vehicle state information according to the vehicle ID, determine whether or not to create a vehicle management message by comparing the vehicle state information with a previously set vehicle state information reference value, create the vehicle management message including a place related to the vehicle state information or position information of other electric vehicles related to the vehicle state information based on the current position information of the electric vehicle, and transmit the vehicle management message to the terminal device, wherein the vehicle management message includes charging history of the electric vehicle which has supplied the power, and a reward for the electric vehicle according to the charging history, and wherein the reward is discounted price when a price is charged for power at a charging station.

5. The system according to claim 4, wherein the vehicle state information includes information on a battery remaining capacity, and wherein, when the battery remaining capacity is lower than a battery remaining capacity set in the vehicle state information reference value:

the electric vehicle matching unit is configured to
search for position information of other electric vehicles which are able to supply power within a reference distance based on the current position information of the electric vehicle, match the electric vehicle configured to supply power and the electric vehicle configured to be supplied with the power, create the vehicle management message including position information of an electric vehicle that can supply power according to a matching result, and transmit the vehicle management message to the terminal device.

6. The system according to claim 4, wherein the vehicle management message further includes an amount of power to be provided when the power is charged and information on the charging station where power will be charged after supplying the power.

7. A control method of an electric vehicle management device, the method comprising:

receiving vehicle state information including battery power information related to operation of an electric vehicle, vehicle identification (ID), current position information and destination information, from a terminal device;

storing the vehicle state information by the vehicle ID and determining whether or not to create a vehicle management message by comparing the vehicle state information with a previously set vehicle state information reference value;

creating the vehicle management message including a place related to the vehicle state information or position information of other electric vehicles related to the vehicle state information based on the current position information of the electric vehicle according to a result of the determination of a vehicle state determination unit, and transmitting the vehicle management message to the terminal device;

collecting charging history of the electric vehicle which has supplied the power based on the vehicle management message; and giving a reward according to the charging history, wherein the reward is discounted price when a price is charged for power at a charging station.

8. The method according to claim 7, wherein the vehicle management message further includes an amount of power to be provided when the power is charged and information on the charging station where power will be charged after supplying the power.

9. The method according to claim 7, wherein the storing comprises:

determining, when power of a battery is lower than a battery remaining capacity set in the reference value, the corresponding electric vehicle as an electric vehicle to be supplied with power; and confirming information on power of electric vehicles operating within a reference distance based on the current position information of the electric vehicle to be supplied with power, and matching an electric vehicle to supply power and the electric vehicle to be supplied with power.

* * * * *